US007495574B2

(12) United States Patent
Rocamora et al.

(10) Patent No.: US 7,495,574 B2
(45) **Date of Patent: *Feb. 24, 2009**

(54) ELECTRICAL SYSTEM CONTROLLING DEVICE WITH WIRELESS COMMUNICATION LINK

(75) Inventors: Richard G. Rocamora, Shanghai (CN); Veselin Skendzic, Pullman, WA (US)

(73) Assignee: Cooper Technologies Company, Houston, TX (US)

(*) Notice: Subject to any disclaimer, the term of this patent is extended or adjusted under 35 U.S.C. 154(b) by 26 days.

This patent is subject to a terminal disclaimer.

(21) Appl. No.: 11/139,988

(22) Filed: May 31, 2005

(65) Prior Publication Data

US 2006/0084419 A1 Apr. 20, 2006

Related U.S. Application Data

(63) Continuation of application No. 10/933,490, filed on Sep. 3, 2004, now abandoned.

(51) Int. Cl.
*G08B 21/00* (2006.01)
*G08B 1/08* (2006.01)
*B23K 11/24* (2006.01)
*H01H 73/00* (2006.01)

(52) U.S. Cl. .................... 340/638; 340/539.1; 307/112; 361/115

(58) Field of Classification Search ......... 340/635–664, 340/539.1, 539.19; 307/112–116; 361/64, 361/71, 93.2, 115, 131
See application file for complete search history.

(56) References Cited

U.S. PATENT DOCUMENTS 4,367,900 A 1/1983 Trümper
4,419,619 A * 12/1983 Jindrick et al. .............. 323/257
4,520,234 A * 5/1985 Fields et al. ............. 379/29.01
4,804,809 A * 2/1989 Thompson et al. ........ 200/17 R
4,814,712 A 3/1989 Burton et al.
4,847,780 A * 7/1989 Gilker et al. .................. 702/64
4,870,531 A 9/1989 Danek
5,534,858 A * 7/1996 Tinkham ............... 340/870.07
6,112,535 A 9/2000 Hollenbeck
6,271,759 B1 8/2001 Weinbach et al.
6,275,366 B1* 8/2001 Gelbien et al. ................ 361/62
6,335,852 B1* 1/2002 Nimmo ..................... 361/93.2
6,529,013 B2 3/2003 Skendzic et al.

(Continued)

FOREIGN PATENT DOCUMENTS

GB 2349020 10/2000

(Continued)

OTHER PUBLICATIONS

PCT Notification of International Search Report and Written Opinion (Application No. PCT/US2005/031328), mailed Feb. 2, 2006, 11 pages.

(Continued)

*Primary Examiner*—Benjamin C Lee
(74) *Attorney, Agent, or Firm*—Fish & Richardson P.C.

(57) ABSTRACT

A system for remotely controlling and monitoring an electrical system includes an electrical system controlling device connected to the electrical system for monitoring and controlling the electrical system and electronic controls for monitoring and controlling the electrical system controlling device. A wireless communications interface enables remote wireless access to the electronic controls.

60 Claims, 6 Drawing Sheets

U.S. PATENT DOCUMENTS

| | | | | |
|---|---|---|---|---|
| 6,687,110 | B2 | 2/2004 | Murray | |
| 6,734,768 | B2 * | 5/2004 | Kim | 335/6 |
| 6,735,534 | B2 * | 5/2004 | McClure et al. | 702/58 |
| 6,753,493 | B2 * | 6/2004 | Rhein et al. | 218/120 |
| 6,766,143 | B1 | 7/2004 | Beckwith | |
| 6,778,370 | B1 * | 8/2004 | LaPlace et al. | 361/71 |
| 6,954,637 | B2 * | 10/2005 | Sasaki et al. | 455/423 |
| 7,133,271 | B2 | 11/2006 | Jonas | |
| 2002/0070698 | A1 | 6/2002 | Spingler | |
| 2002/0135964 | A1 * | 9/2002 | Murray | 361/131 |
| 2003/0151489 | A1 * | 8/2003 | Shbiro et al. | 340/3.1 |
| 2005/0135030 | A1 * | 6/2005 | Jonas et al. | 361/71 |

FOREIGN PATENT DOCUMENTS

| | | |
|---|---|---|
| WO | WO 2004/053623 | 6/2004 |

OTHER PUBLICATIONS

Communication from EPO dated Dec. 14, 2007, pursuant to Article 94(3) EPC.

* cited by examiner

ELECTRICAL SYSTEM CONTROLLING DEVICE WITH WIRELESS COMMUNICATION LINK

CROSS REFERENCE TO RELATED APPLICATIONS

This application is a continuation of U.S. application Ser. No. 10/933,490, filed Sep. 3, 2004 now abandoned, and titled "Electrical System Controlling Device With Wireless Communication Link," the entire contents of which are hereby incorporated by reference.

TECHNICAL FIELD

BACKGROUND

In conventional implementations, a high voltage switchgear and its associated electronic controls are physically separated. Typically, the switchgear sits near the top of a utility pole while the electronic controls are mounted in a cabinet closer to the ground. The switchgear and its associated electronic controls are connected by one or more multiconductor cables that share a common grounding system.

SUMMARY

In one general aspect, a system for controlling and monitoring an electrical system includes an electrical system controlling device connected to the electrical system for monitoring and controlling the electrical system and electronic controls for monitoring and controlling the electrical system controlling device. A wireless communications interface enables remote wireless access to the electronic controls.

Implementations may include one or more of the following features. For example, the electronic controls may be embedded within the electrical system controlling device. The wireless communications interface may be embedded within the electrical system controlling device. The wireless communications interface may include a wireless receiver and a wireless transmitter. The wireless receiver and the wireless transmitter may be included in a single device.

A remote operator interface may enable access to the electronic controls through the wireless communications interface, where the remote operator interface is physically separated from the electrical system controlling device, electronic controls, and the wireless communications interface. The remote operator interface may include interface software that enables a user of the remote operator interface to remotely access the electronic controls. A virtual front panel application may provide a graphical interface to the interface software that resembles a physical front panel used to locally access the electronic controls. The remote operator interface may operate on a mobile computing device. The mobile computing device may include a laptop computer and/or a personal digital assistant (PDA). Authentication may be required for the remote operator interface to access the electronic controls system.

Communications sent and received by the wireless communications interface may be encrypted. The electronic controls may include a microprocessor to encrypt communications sent by the wireless communications interface. The wireless communications interface may enable transmission of information from the electrical system controlling device. The transmission of information from the electrical system controlling device may occur immediately after measurements of parameters of the electrical system are taken. The information may include oscillography from the electrical system controlling device, a transcript of events that occur within the electrical system controlling device, digitalized current and voltage measurements, and/or information from a data profiler within the electronic controls.

The wireless communications interface may send and receive communications conforming to IEEE 802.11a standard wireless Ethernet protocol, IEEE 802.11b standard wireless Ethernet protocol, IEEE 802.11g standard wireless Ethernet protocol, Bluetooth wireless communication protocol, a fixed radio frequency protocol, and/or spread spectrum radio protocol.

The electrical system controlling device may be a switchgear, a single-phase recloser, a three-phase recloser, a regulator, a pad-mounted electrical system controlling device, a sectionalizer, a capacitor switch, a switch, or a faulted circuit indicator.

In another general aspect, controlling and monitoring an electrical system may include connecting to electronic controls embedded within an electrical system controlling device through a wireless communications interface, monitoring the electrical system using the electronic controls through the wireless communications interface, and controlling the electrical system using the electronic controls through the wireless communications interface.

Implementations may include one or more of the following features. For example, connecting to the electronic controls may include accessing the electronic controls, authenticating an account with the electronic controls, and establishing a secure connection to the electronic controls. Communications sent to and from the electronic controls through the wireless communications interface may be encrypted. Remote operation of the electronic controls may be enabled using the wireless communications interface.

Other features will be apparent from the description and drawings, and from the claims.

DESCRIPTION OF DRAWINGS

Like reference symbols in the various drawings indicate like elements.

DETAILED DESCRIPTION

Figure 1:
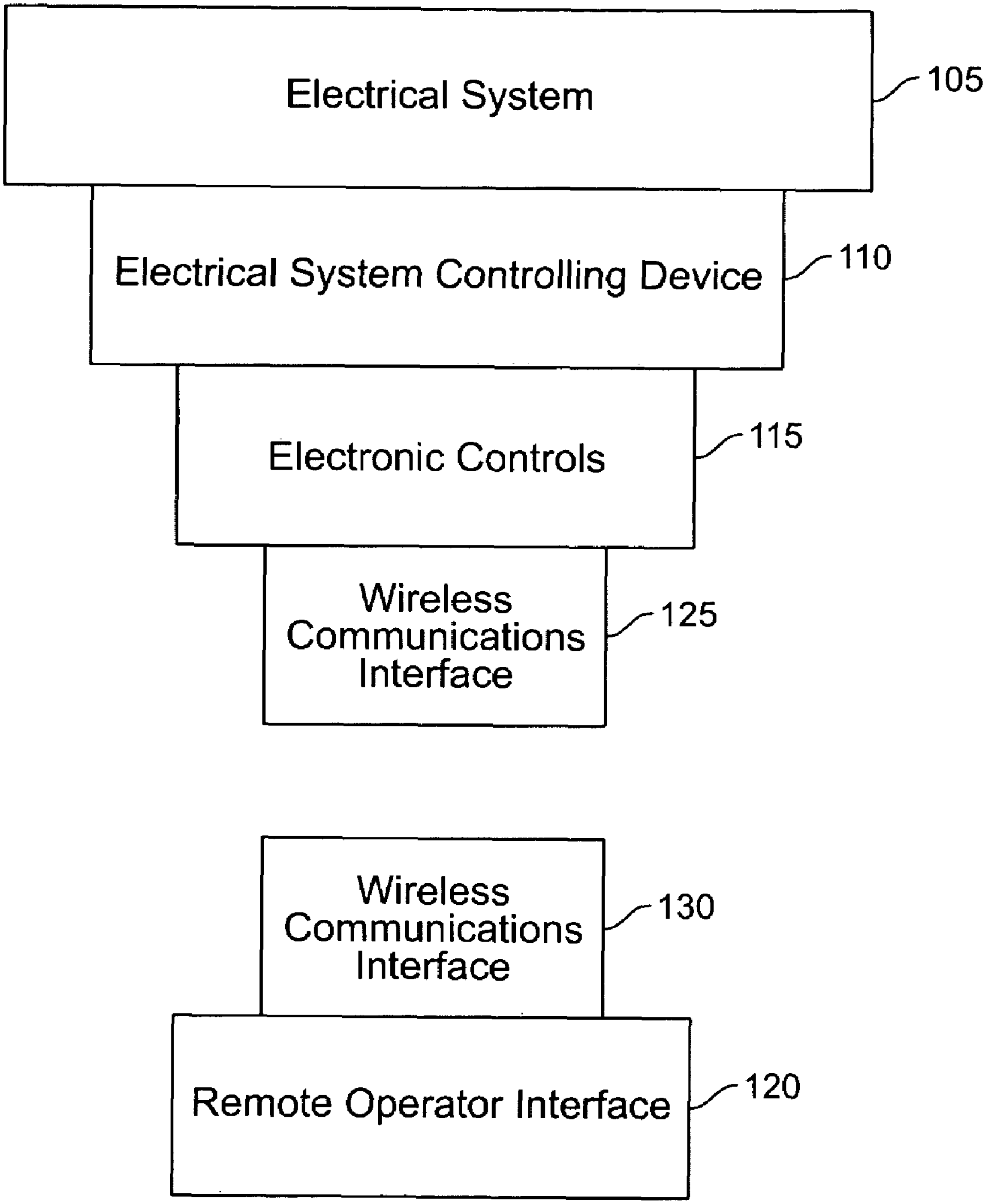
FIG. 1 is a block diagram of an electrical system that is wirelessly monitored and controlled with an electrical system controlling device.

Referring to FIG. 1, an electrical system 105 is controlled by an electrical system controlling device 110, which is, in turn, controlled by electronic controls 115 that are accessed wirelessly through a remote operator interface 120. Communication between the electronic controls 115 and the remote operator interface 120 occurs through a wireless communications interface 125 at the electronic controls 115 and a wireless communications interface 130 at the remote operator interface 120.

The electrical system 105 is any electrical system that may be controlled by the electrical system controlling device 110. For example, the electrical system controlling device 110 may be a switchgear, a single-phase recloser, a three-phase recloser, a regulator, a pad-mounted electrical system controlling device, a sectionalizer, a switch, a capacitor switch, or a faulted circuit indicator (FCI), and the electrical system 105 may be any electrical system that may be controlled by those devices.

The switchgear provides fault protection to the electrical system 105 by opening or isolating problem areas based on trouble that may be sensed by a remotely-located protective relay, a controller, or the switchgear itself. The switchgear may be a recloser, a switch, or a breaker.

The single-phase recloser is used to protect single-phase lines, such as branches or taps of a three-phase feeder. The single-phase recloser also may be used on three-phase circuits where the load is predominantly single phase. The three-phase recloser is used to protect three phase circuits. For example, the three-phase recloser may be used as a main breaker for a substation with a rating up to 1200 amps and 20 KA, or for a distribution feeder to segment the feeder into multiple zones of protection.

The regulator adjusts or regulates high or low voltage levels to within specific parameters automatically. The regulator may be used on four-wire, multi-grounded systems, and three-wire uni-grounded and underground systems. For example, the regulator may be a step voltage regulator, an auto-booster, a pad-mounted single-phase voltage regulator or a regulator control. When used with the regulator, the electronic controls 115 features built-in metering, voltage limiting, voltage reduction, reverse power flow operation, resident digital communications capability, time-tagged demand metering, profile recorder, tap position tracking, and source voltage calculation without an additional potential transformer.

The pad mounted electrical system controlling device is an electrical system controlling device that is mounted underground. Portions of the pad-mounted electrical system controlling device may be located above ground to enable operator access. The pad mounted electrical system controlling device may be a pad-mounted voltage regulator or a pad-mounted transformer.

The sectionalizer is a self-contained, circuit-opening device used in conjunction with source-side protective devices, such as reclosers or circuit breakers, to automatically isolate faulted sections of electrical distribution systems. The sectionalizer senses current flow above a preset level, and when the source-side protective device opens to de-energize the circuit, the sectionalizer counts the overcurrent interruption. The sectionalizer may be a single-phase hydraulic sectionalizer, a three-phase hydraulic sectionalizer, or a three-phase electronic sectionalizer.

The switch may be a single-phase or three-phase electrically operated oil or vacuum switch. The switch may be used to improve power quality, VAR control, and synchronous closing applications. The switch also may be used as an additional sectionalizing point between reclosers and to isolate individual loads on distribution system laterals. The capacitor switch is a special type of switch that may be used in single-phase and three-phase applications. For instance, a single phase capacitor switch may be used to switch capacitors up to 34.5 kV grounded capacitor banks and are typically used in pole-top installations. A three-phase capacitor switch also may be used for capacitor bank switching.

The faulted circuit indicator detects a fault on a circuit to which the faulted circuit is connected. The faulted circuit indicator resets automatically upon restoration of system power or after a predetermined time period. The faulted circuit indicator may be a test point reset FCI, an electrostatic reset FCI, a current reset FCI, a delayed reset FCI, a low voltage reset FCI, or a manual reset FCI.

The electronic controls 115 are used to monitor and control the electrical system controlling device 110. The electronic controls 115 may request information related to the operation of the electrical system 105 and the electrical system controlling device 110 from the electrical system controlling device 110. The electronic controls 115 also may send signals to the electrical system controlling device 110 that control the operation of the electrical system controlling device 110. The electronic controls 115 may include a physical front panel or some other interface and associated electronic circuitry with which a user located substantially at the electronic controls 115 may interact with the electronic controls 115 to monitor and control the electrical system controlling device 110. In some exemplary implementations, the electronic controls 115 are embedded within the electrical system controlling device 110.

The remote operator interface 120 may be used to wirelessly access the electronic controls 115 to monitor and control the electrical system controlling device 110. Therefore, the remote operator interface 120 may be used away from the electronic controls 115 instead of the front panel of the electrical controls 115. For example, the remote operator interface 120 may be a laptop computer, a personal digital assistant (PDA), or another computing device, hand-held or otherwise, with wireless networking capabilities. The remote operator interface 120 may be used by utility personnel near the electrical system 105 or by personnel at a central utility control center that may wirelessly communicate with the electronic controls 115.

The remote operator interface 120 includes standard interface software that enables a user of the remote operator interface 120 to access the electronic control. The standard interface software communicates with the electronic controls 115 to enable the user to control the electrical system controlling device 110. The remote operator interface 120 also may include a virtual front panel application that provides a graphical interface to the standard interface software to the user. In one implementation, the graphical interface resembles the physical front panel of the electronic controls 115. Making the graphical interface resemble the physical front panel enables a user familiar with the front panel to quickly learn how to use the graphical interface of the remote operator interface 120 to interact with the electronic controls 115.

The electronic controls 115 and the standard interface software communicate through the wireless communications interfaces 125 and 130, respectively. The wireless communications interfaces 125 and 130 include wireless transmitters and receivers that are operable to send and receive information between the standard interface software and the corresponding software module. For example, the transmitters of the wireless communications interface 130 may transmit controlling signals from the remote operator interface 120, and the receivers of the wireless communications interface 125 may receive the controlling signals and pass the controlling signals to the electronic controls 115. Similarly, the transmitters of the wireless communications interface 125 may transmit information describing the operation of the electrical system controlling device 110 from the electronic controls 115, and the receivers of the wireless communications interface 130 may receive the information and pass the information to the remote operator interface 120. The wireless communications interfaces 125 and 130 may communicate using a standard communications protocol, such as Bluetooth wireless communication protocol, IEEE 802.11a standard wireless Ethernet protocol, IEEE 802.11b standard wireless Ethernet protocol, IEEE 802.11g standard wireless Ethernet protocol, fixed frequency radio protocol, or spread spectrum radio protocol. The wireless communications interfaces 125 and 130 may include antennas to facilitate sending and receiving information.

In general, the electrical system controlling device 110 may be controlled by wirelessly accessing the electronic controls 115 with the remote operator interface 120 using the wireless communications interfaces 125 and 130. In the following figures, an exemplary implementation in which the electrical system controlling device 110 is a switchgear is discussed in further detail. Such an implementation is provided for exemplary purposes only to illustrate in further detail how the electronic controls 115 may be accessed wirelessly with the remote operator interface 120 to control the electrical system controlling device 110.

Figure 2:
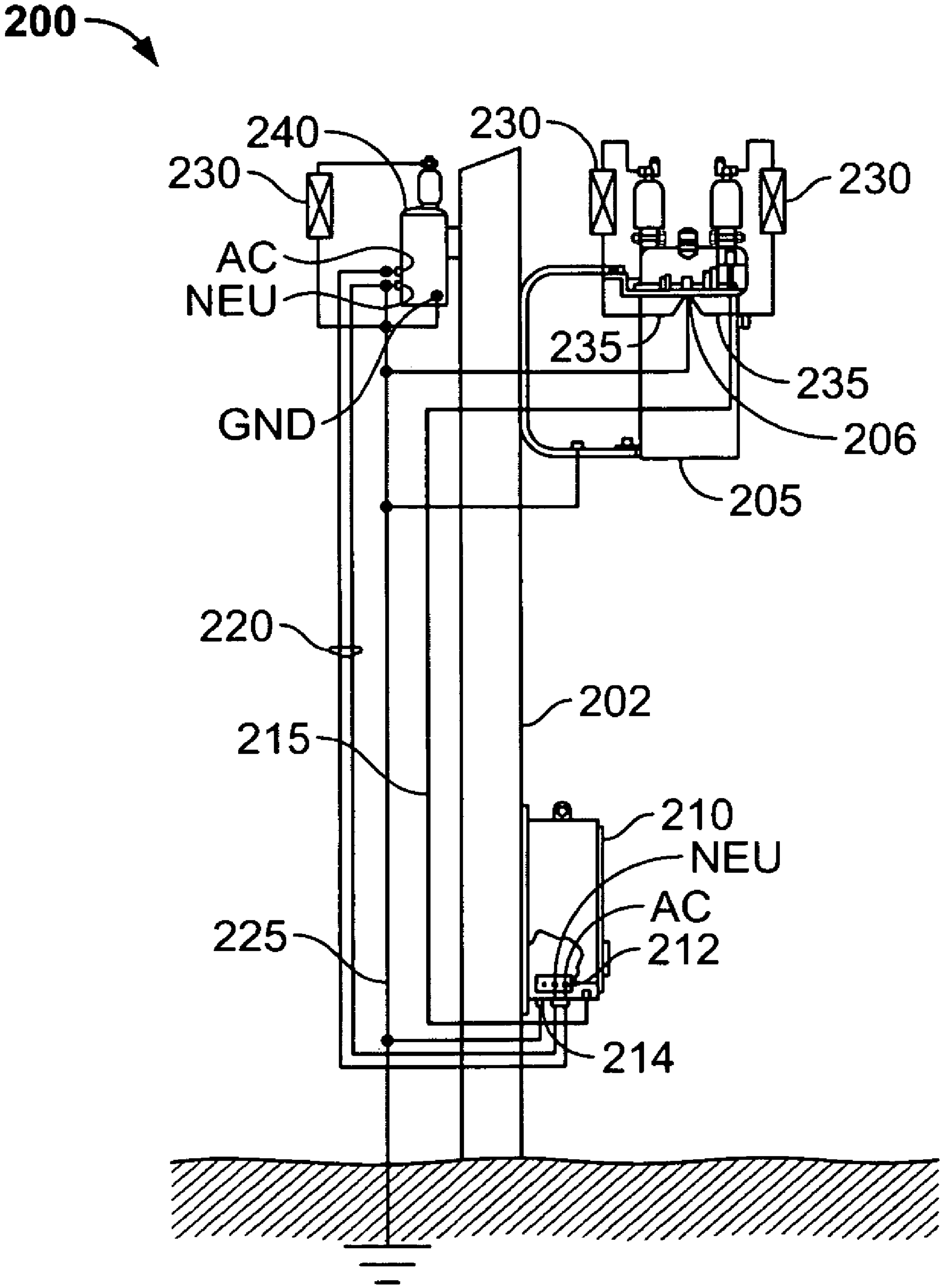
FIG. 2 is an illustration of a conventional switchgear and electronic controls.

Referring to FIG. 2, a conventional high voltage electrical system 200 at a utility pole 202 includes a switchgear 205 that is connected to electronic controls 210 by a control cable 215. The switchgear 205 is mounted near the top of a utility pole 202. In general, the switchgear 205 is part of a system for controlling and monitoring the operation of the electrical system 200 by providing fault protection to open and/or isolate problem areas based on trouble that may be sensed by a remotely-located protective relay, a controller, or the switchgear 205 itself. The switchgear 205 may include assemblies of switching or interrupting devices, along with control, metering, protective, and regulating devices. For example, the switchgear may be a recloser, a switch, or a breaker. In one implementation, the switchgear provides switching and/or tying operations between connections of the electrical system 200. The switchgear 205 includes a switchgear head ground 206 that connects the switchgear 205 to ground.

The electronic controls 210 are located near the bottom of the pole 202. The electronic controls 210 include an input terminal block 212 and an external lug 214 that provides a customer ground connection. The electronic controls 210 also include an interface and other electronic circuitry through which a user can monitor and control the operation of the switchgear 205. Information and commands are sent between the electronic controls 210 and the switchgear 205 by way of the control cable 215. Thus, in the conventional high voltage electrical system 200, the switchgear 205 and the electronic controls 210 that enable control of the switchgear 205 are physically separated, with the switchgear 205 being near the top of the pole 202 and the electronic controls 210 being near the bottom.

A supply voltage cable 220 and a pole ground cable 225 also connect to the electronic controls 210. The supply voltage cable 220 connects at the input terminal block 212, while the pole ground cable 225 connects at the external lug 214.

The pole ground cable 225 also connects to surge arresters 230 by way of a surge arrester ground cable 235. The surge arresters are included in the high voltage switchgear system 200 to prevent high potentials generated by lightning strikes or switching surges from damaging the switchgear 205 or the electronic controls 210. The control cable 215, the supply voltage cable 220, and the pole ground 225 all run over the entire length of the pole 202.

A transformer 240 is connected to the input terminal block 212 of the electronic controls 210 through the supply voltage cable 220. The electronic controls 210 and the transformer 240 also share a common connection to the pole ground cable 225.

Figure 3:
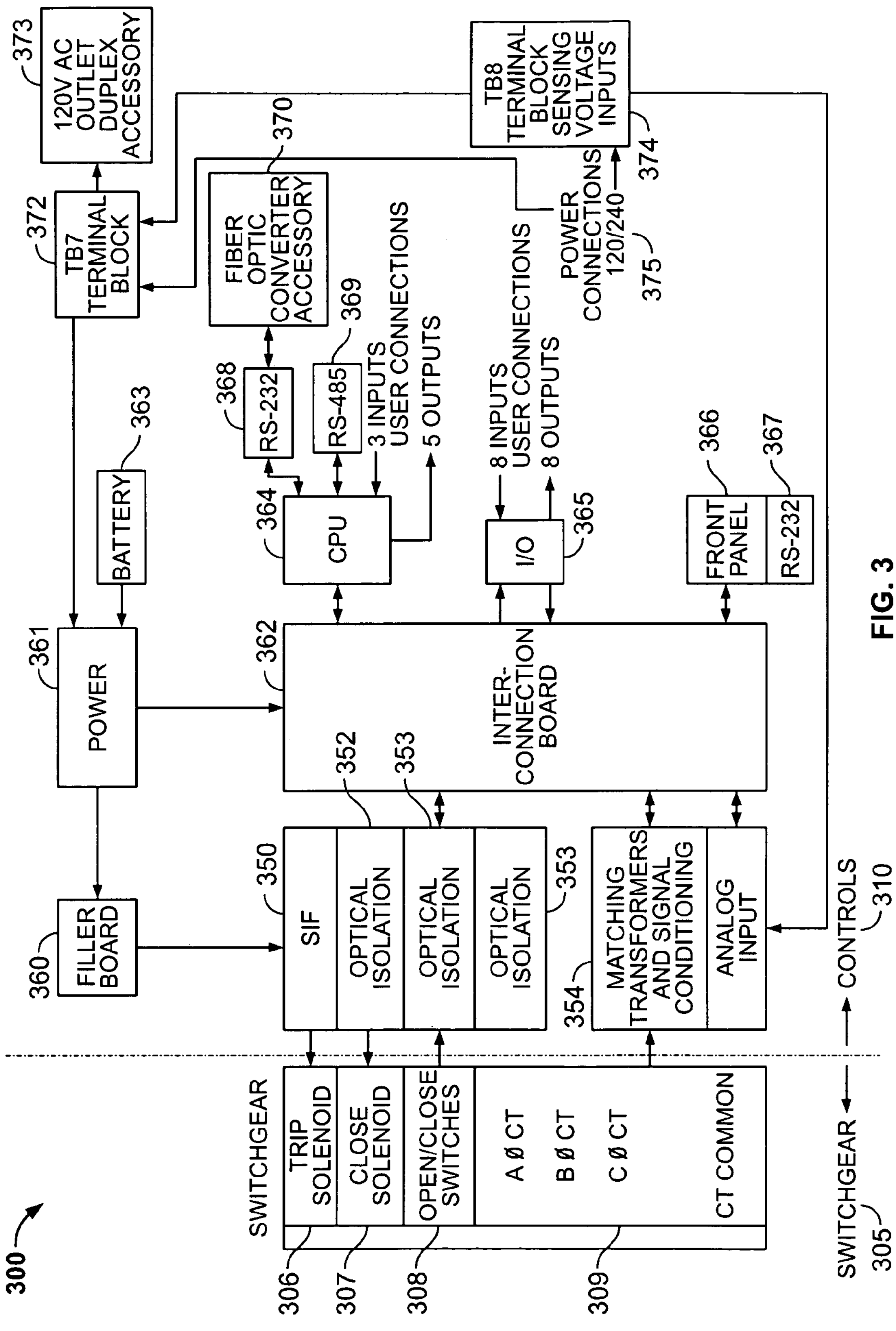
FIG. 3 is a block diagram of a conventional switchgear and electronic controls.

Referring to FIG. 3, a conventional high voltage switchgear system 300 includes two sections: the switchgear 305 (e.g., the switchgear 205 of FIG. 2) and the electronic controls 310 (e.g., the electronic controls 210 of FIG. 2). The switchgear 305 contains a trip solenoid 306, a close solenoid 307, open and close switches 308, and current transformers (CTs) 309 that produce signals representative of the three phases (AØ, BØ, CØ) of the three phase voltage being controlled.

Certain components of the electronic controls 310 typically are used for surge protection when the switchgear 305 and the electronic controls 310 are physically separated. These surge protection components include, for example, a switchgear interface (SIF) 350 that controls the trip solenoid 306, optical isolation components 352 and 353 that interface with the close solenoid 307 and the open/close switches 308, and matching transformers and signal conditioning components 354 that receive and process signals from the CTs.

Also included in the electronic controls 310 are a filler board 360 and a power supply 361. The filler board 360, which connects to the SIF 350, is powered by the power supply 361.

An interconnection board 362 connects various components of the electronic controls 310. The board 362 is powered by the power supply 361, which receives backup power from a battery 363. The board 362 is also coupled to a central processing unit (CPU) 364 that includes multiple inputs and outputs for user connections, an input/output port 365 with multiple inputs and outputs for user connections, and a front panel 366 that is connected to a first RS-232 connection 367. A second RS-232 connection 368 and an RS-485 connection 369 are coupled to the CPU 364, with the second RS-232 connection 368 being coupled to a fiber optic converter accessory 370. A TB7 terminal block 372 outputs to a 220 V AC outlet duplex accessory 373 and to the power supply 361. The block 372 receives inputs from power connections 375 and a TB8 terminal block 374 that senses voltage inputs from the power connections 375.

Figure 4:
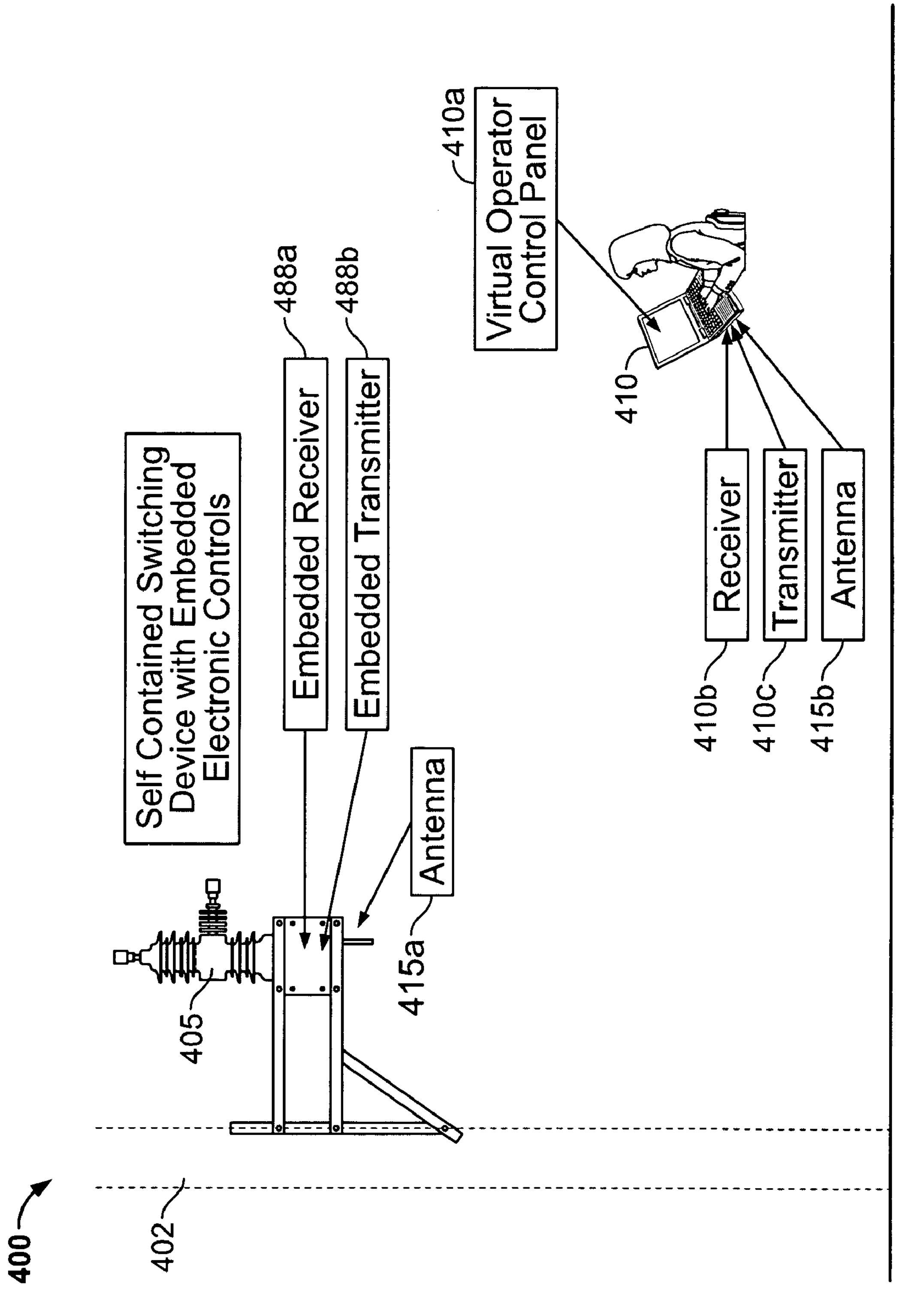
FIG. 4 is an illustration of a switchgear with embedded electronic controls and a wireless communications link.

Referring to FIG. 4, a high voltage electrical system 400 at a utility pole 402 includes switchgear 405 that has a wireless communications link among its embedded electronic controls. The switchgear 405 also can reclose the line after a fault has been cleared in order to find out if the fault was permanent or temporary. The switchgear 405 may be capable of communicating with a central utility control system using the Supervisory Control And Data Acquisition (SCADA) protocol, and coordinating its action with one or more neighboring switchgear devices for optimal line sectionalizing and automated system restoration.

Switchgear 405 contains embedded electronic controls that are used to monitor, configure, and control the operation of the switchgear 405. Also contained within the switchgear 405 is a wireless communication link that allows a remote user to access the embedded electronic controls. The remote user interacts with the switchgear 405 using a remote controller 410 that is capable of displaying information from the switchgear 405 and communicating with the switchgear 405 without being connected to the switchgear 405. The remote controller 410 may include a laptop computer, a personal digital assistant (PDA), or another computing device, hand-held or otherwise, with wireless networking capabilities. The remote controller 410 includes a visual display 410*a* that displays the controller interface to the user. The remote controller 410 also is capable of taking input from the user that is trying to control and configure the switchgear 405. For example, the remote controller 410 may include a keyboard, a mouse, and/or a touch-screen and stylus. The remote controller 410 also includes a wireless receiver 410*b* that receives information sent from the switchgear 405, and a wireless transmitter 410*c* that sends information to the switchgear 405. The wireless receiver 410*b* and the wireless transmitter 410*c* may be separate devices or the functionality of the wireless receiver 410*b* and the wireless transmitter 410*c* may be included within a single device.

Information that is sent from the remote controller 410 is received by a wireless receiver 488*a* that is embedded within the switchgear 405. Likewise, information that is received by the remote controller 410 is sent by a wireless transmitter 488*b* that is embedded within the switchgear 405. The wireless receivers 410*b* and 488*a* and the wireless transmitters 410*c* and 488*b* may communicate using a radio frequency (RF) communications protocol. The RF technology may be, for example, Bluetooth wireless communication protocol, IEEE 802.11a standard wireless Ethernet protocol, IEEE 802.11b standard wireless Ethernet protocol, IEEE 802.11g standard wireless Ethernet protocol, fixed frequency radio protocol, or spread spectrum radio protocol.

The antenna 415*a* that is mounted on the switchgear 405 and the antenna 415*b* that is part of the remote controller 410 take the place of the conventional control cable 215 from FIG. 2. The antennas 415*a* and 415*b* and in communication of RF signals between the switchgear 405 and the remote controller 410.

The wireless communications link allows the remote user to access all measured parameters of the switchgear 405 in real time or substantially real time. This information includes current and voltage measurements, oscillography, a data profiler, and a sequence of events recorder. The wireless link also provides access to the device programming port, which enables full software control and periodic download of software and firmware updates that support an extended product life cycle. The wireless communication link also gives the user access and full control over the programmable logic capabilities within the switchgear 405.

Placing a wireless communication link within the switchgear 405 also brings added safety and convenience to using the switchgear 405. The wireless communication link brings the electronic controls directly to the user through the remote controller 410. In other words, the user does not have to be physically near and/or connected to the switchgear 405. Thus, a user would not need to leave the safety of the truck to physically interface with the switchgear 405, to connect to the switchgear 405 with wires using, for example, an RS-232 link, to climb the utility pole 402 to access the switchgear 405, or to get the utility truck into the immediate vicinity of the switchgear 405. All of these benefits may be advantageous in hard to reach or otherwise dangerous locations.

The wireless communications link also allows for added security in the switchgear 405. Password authentication may be used to guarantee that only authorized individuals are allowed to access the functions of the switchgear 405. Transmission error checking may be used to detect and avoid erroneous commands, and data encryption may be used to prevent outsiders from eavesdropping on the communication between the switchgear 405 and the remote controller 410.

Figure 5:
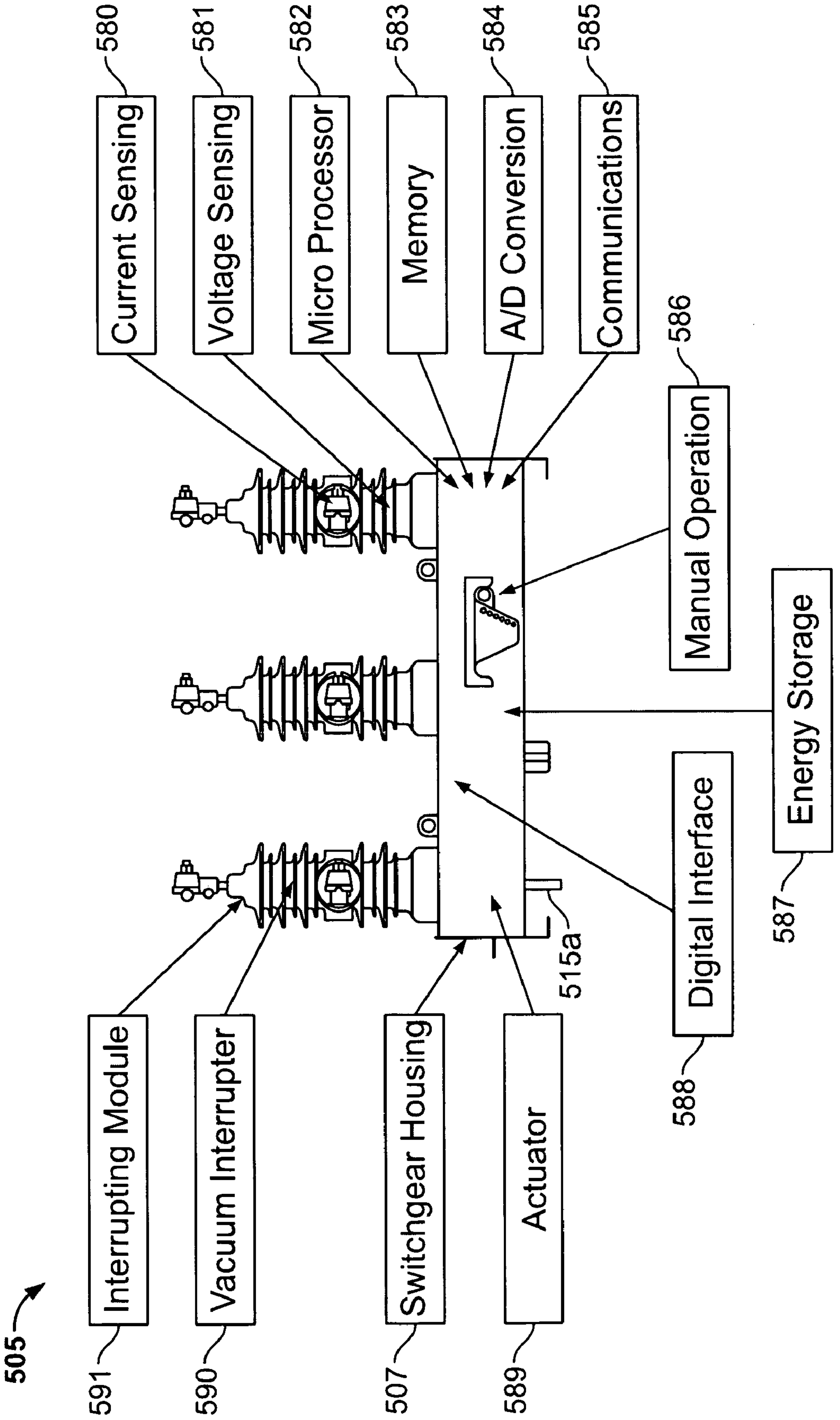
FIG. 5 is an illustration of a switchgear with embedded electronic controls.

Referring to FIG. 5, switchgear 505 includes embedded electronic controls. The switchgear 505 is used to manage the operation of a power distribution system, and is capable of interrupting high currents caused by power system faults. The switchgear 505 can also reclose the line after a fault has been cleared in order to find out if the fault was permanent or temporary. The switchgear 505 also is capable of communicating with a central utility control systems using the SCADA protocol, and coordinating its action with one or more neighboring switchgear devices for optimal line sectionalizing and automated system restoration.

In the switchgear 505, the electronic controls that previously were physically separated from the switchgear and located near the bottom of the utility pole are now contained within the switchgear housing 507, which may be located near the top of the utility pole as a single, self-contained physical device. The switchgear housing 507 includes a current sensing device 580 (e.g., a CT) for each phase, a voltage sensing device 581 for each phase, a microprocessor 582, memory 583, an analog-to-digital converter 584, a communications device 585, a manual operation device 586, an energy storage device 587, a digital interface 588, an actuator 589, and an interrupting module 591 for each phase, with the interrupting module 591 including a vacuum interrupter 590, a current sensing device 580, and a voltage sensing device 581.

The vacuum interrupter 590 is the primary current interrupting device. The vacuum interrupter 590 uses movable contacts located in a vacuum that serves as an insulating and interrupting medium. The vacuum interrupter 590 is molded into the interrupting module 591, which is made from a cycloaliphatic, prefilled, epoxy casting resin and provides weather protection, insulation, and mechanical support to the vacuum interrupter 590. The lower half of the interrupting module 591 is occupied by a cavity that contains an operating rod that functions as a mechanical link for operating the vacuum interrupter.

Aside from the vacuum interrupters 590, the switchgear housing 507 is primarily used to house the vacuum interrupter operating mechanism and the actuator 589, which is the main source of motion. The switchgear housing 507 also may contain the other electronic components necessary to measure the power system current and voltage, to make decisions about the status of the power system, to communicate with external devices, and to convert, store and control energy necessary for moving the actuator 589.

Initially, current from the power system is brought through the high voltage terminals of the interrupting module 591. The current flows through the vacuum interrupter 590 and is measured by the current sensing device 580. The voltage sensing device 581 also may be within the interrupting module 591, either as part of the current sensing device 580 or within the cavity containing the operating rod. Voltage and current measurements are subsequently digitized by the analog-to-digital converter 584, processed by the microprocessor 582, and stored in the memory 583.

If predefined decision criteria are met, microprocessor 582 may issue a command to open or close the vacuum interrupter 590. To do this, the microprocessor 582 issues a command to an actuator control circuit, which, in turn, directs the energy from the energy storage device 587 into the actuator 589. The actuator 589 then creates force that is transmitted via the mechanical linkages to the operating rod in the cavity of the interrupting module 591. This force causes the operating rod to move, which, in turn, moves the movable contact of the vacuum interrupter 590 to interrupt or establish a high voltage circuit in the electrical system.

The energy storage device 587, which may be a battery, enables autonomous switchgear operation during power system faults and power outages. The energy storage device 587 may provide backup energy to the control system, the communication device 585, or a switchgear mechanism, such as the actuator 589. By providing backup energy, the energy storage-device 587 enables the switchgear 505 to measure power system parameters, communicate with other switchgear units, make decisions, and perform actions, such as opening or closing the switchgear, necessary to restore power to the affected part of the power system. The energy storage device 587 may include a combination of conventional capacitor and supercapacitor storage technologies with typical stored energy levels in the 50 to 1000 J range. Supercapacitor energy storage typically uses 10 to 300 F of capacitance operated at 2.5V, and provides backup power over a period of 30 to 300 seconds.

Also contained within the switchgear housing 507 is a digital interface 588 that is used to exchange data with a remote operator panel or to interface with remote devices.

The digital interface 588 may include a Control Area Network (CAN) interface, or a fiber-optic based communications interface, such as one that employs serial communications over fiber optic or Ethernet. The digital interface may also include the wireless receiver 488*a* and the wireless transmitter 488*b* of FIG. 4. An antenna 515*a* extends out of the switchgear housing 507 and connects to the wireless receiver 488*a* and the wireless transmitter 488*b*.

The manual operation device 586 may be used to activate the mechanical linkages to the operating rods using a hotstick so as to accomplish the open or close operations manually.

The communications device 585 may be used to interface with the central utility control centers through SCADA, to coordinate operation with neighboring switchgear, and to provide for remote management from an operator panel. The communications device 585 may include both long-range and short-range communications devices to facilitate the communications performed by the switchgear 505.

Having the electronic controls embedded with the switchgear 505 offers significant advantages with regards to surge susceptibility, cost, installation, and cabling requirements. In this configuration, the interfaces are contained within the switchgear housing 507, thus eliminating destructive potential differences between the sensors, such as current sensing device 580 and voltage sensing device 581, and the operating mechanism, such as actuator 589. A cost savings provided by the self-contained switchgear unit with embedded electronic controls results from its use of only one housing instead of two housings as illustrated in the conventional system of FIG. 2. The decreased surge susceptibility also results in reduced maintenance time and expense. The self-contained nature of this configuration also eliminates the need for the cabling to run the full length of the pole between the electronic controls and the switchgear 505.

This tight integration between the switchgear mechanism and the electronic controls also supports providing the user with enhanced diagnostic and switchgear operation monitoring functions, such as motion profile logging, temperature monitoring, and contact life monitoring. Short control cable runs that are fully enclosed within the switchgear 505 also may be used instead of long control cable runs, which are an external source of noise. This results in enhanced signal integrity within the switchgear 505, which allows for increasing the precision of high voltage and high current measurements. The close proximity of measurement electronics to the high voltage switchgear components also enables the efficient use of low energy voltage and current measurement technologies, such as high impedance resistive and capacitive voltage dividers and Rogowski coils.

Figure 6:
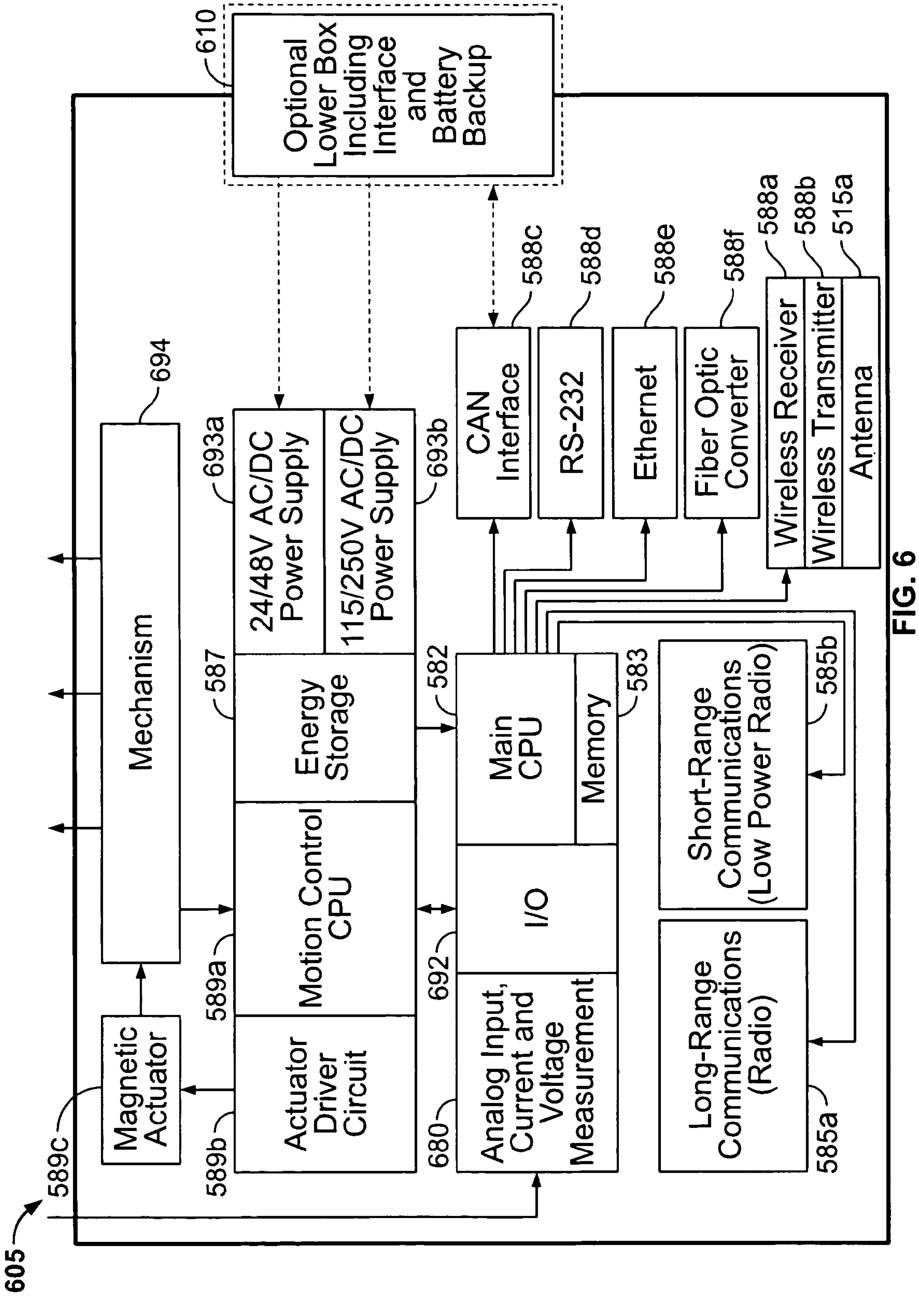
FIG. 6 is a block diagram of a switchgear with embedded electronic controls.

Referring to FIG. 6, the electronic controls of a switchgear 605 are embedded within the switchgear housing. The embedded electronic controls include an analog input, current and voltage measurement device 680, a main CPU 582, memory 583, a long-range communications device 585*a*, a short-range communications device 585*b*, an energy storage device 587, and an input/output device 692. Digital interfaces may include a wireless receiver 588*a*, a wireless transmitter 588*b*, a Control Area Network (CAN) interface 588*c*, a RS-232 interface 588*d*, an Ethernet interface 588*e*, and a fiber optic converter interface 588*f*. When a wireless receiver 588*a* and a wireless receiver 588*b* are used, the wireless receiver 588*a* and the wireless receiver 588*b* connect to the antenna 515*a*. The switchgear 605 also includes a motion control CPU 589*a* that outputs to an actuator driver circuit 589*b* that controls a magnetic actuator 589*c*, all of which collectively form the actuator 589 from FIG. 5. The motion control CPU 589*a*, the actuator driver circuit 589*b*, and the actuator 589*c* drive the mechanism 694 of the switchgear 605. The switchgear 605 also includes a 24/48 V AC/DC power supply 693*a* and a 115/250 V AC/DC power supply 693*b*.

An optional lower box 610, separate from the switchgear 605, may be included at another location such as near the bottom of a utility pole. The optional lower box 610 may house an interface for enabling a user to monitor and control the switchgear 605 and/or a battery backup to supply additional backup power beyond the power provided by the embedded energy storage device 487.

Current from the electrical power system flows through the switchgear 505 and is measured by the analog input, current and voltage measurement device 680, which also includes the analog to digital converter and corresponds to the current sensing device 580, the voltage sensing device 581, and the analog-to-digital converter 584 of FIG. 5. The electrical power system current and voltage are measured by the device 680 and the measurements are digitized by the analog-to-digital converter of the device 680. The digitized information is sent to the main CPU 582 and stored in memory 583, which correspond to microprocessor 582 and memory 583 of FIG. 5.

Based on the measurements, the main CPU 582 may decide to issue a command to open or close the vacuum interrupters 590 of FIG. 5. To do this, the main CPU 582 controls the motion control CPU 589*a* by way of the input/output device 692, which is used by the main CPU 582 to issue orders to adjoining circuits. The motion control CPU 589*a* then works with the actuator driver circuit 589*b* to control and deliver energy to the magnetic actuator 589*c*. The magnetic actuator 589*c* then causes the mechanism 694 to move. The mechanism 694 is connected to the operating rods in the lower cavities of the interrupting modules 591 of FIG. 5. The motion of the operating rod causes the vacuum interrupter 590 of FIG. 5 to open or close.

The wireless receiver 588*a*, the wireless transmitter 588*b*, the CAN interface 588*c*, the RS-232 interface 588*d*, the Ethernet interface 588*e*, and the Fiber Optic Converter interface 588*f* correspond to digital interface 588 of FIG. 5. Other digital-type interfaces are possible as well. The wireless receiver 588*a* and the wireless transmitter 588*b* connect to the antenna 515*a*, through which communication with a remote device occurs. The remote device can be used to monitor, control, and configure the switchgear 505. The CAN interface 588*c* may be used to connect to an electronic controller contained in the optional lower box 510, while the RS-232 interface 588*d* may be used as a programming and maintenance point. Both the Ethernet interface 588*e* and the fiber-optic converter 588*f* may be used for long distance communication such as over a wide area network (WAN), the Internet, or other communications network.

The long-range communications device 585*a* and the short-range communications device 585*b* correspond to the communications device 585 of FIG. 5. The long-range communications device 585*a* may be used to interface with central utility control centers through SCADA or to coordinate operation with neighboring protection devices. The short-range communications device 585*b* supplements the operation of the long-range communications device 585*a* by providing a remote device management functionality through a virtual, communications based operator panel. In one implementation, both communications devices 585*a* and 585*b* may be radios, with the short-range communications device 585*b* being a lower power radio.

The energy storage device 587, the 24/48 V AC/DC power supply 693*a*, and the 115/250 V AC/DC power supply 693*b* all supply backup energy that enables autonomous switchgear operation throughout power system faults and power outages. The 24/48 V AC/DC power supply 693*a* and the 115/250 V AC/DC power supply 693*b* both connect to the optional lower box 610 or some other external source.

It will be understood that various modifications may be made. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A system for remotely controlling and monitoring an electrical system comprising:

an electrical system controlling device including a housing, and contacts enclosed in the housing, and being connected to a power line included in a high-voltage electrical distribution system for monitoring and controlling distribution of electricity through the high-voltage electrical distribution system through opening and closing of the contacts;

electronic controls within the housing for monitoring and controlling the electrical system controlling device, wherein the electrical system controlling device is mounted on a structure that is part of the high-voltage electrical distribution system; and a wireless communications interface remote from the housing that enables remote wireless access to the electronic controls to enable a remote device to wirelessly access information of the electrical system controlling device and to wirelessly access a programming port of the electrical system controlling device.

2. The system of claim 1 wherein enabling a remote devices to wirelessly access information of the of the electrical controlling device comprises display of the information of the electrical controlling device at the wireless communications interface.

3. The system of claim 1 further comprising a second wireless communications interface embedded within the electrical system controlling device.

4. The system of claim 1 wherein the wireless communications interface includes a wireless receiver and a wireless transmitter.

5. The system of claim 4 wherein the wireless receiver and the wireless transmitter are included in a single device.

6. The system of claim 1 further comprising a remote operator interface that enables access to the electronic controls through the wireless communications interface, wherein the remote operator interface is physically separated from the electrical system controlling device, the electronic controls, and the wireless communications interface.

7. The system of claim 6 wherein the remote operator interface includes interface software that enables a user of the remote operator interface to remotely access the electronic controls.

8. The system of claim 7 wherein a virtual front panel application provides a graphical interface to the interface software that resembles a physical front panel used to locally access the electronic controls.

9. The system of claim 6 wherein the remote operator interface operates on a mobile computing device.

10. The system of claim 9 wherein the mobile computing device includes a laptop computer.

11. The system of claim 9 wherein the mobile computing device includes a personal digital assistant (PDA).

12. The system of claim 6 wherein authentication is required for the remote operator interface to access the electronic controls.

13. The system of claim 1 wherein communications sent and received by the wireless communications interface are encrypted.

14. The system of claim 13 wherein the electronic controls include a microprocessor to encrypt the communications sent by the wireless communications interface.

15. The system of claim 1 wherein the wireless communications interface enables transmission of information from the electrical system controlling device.

16. The system of claim 15 wherein the transmission of information from the electrical system controlling device occurs immediately after measurements of parameters of the electrical system controlling device are taken.

17. The system of claim 15 wherein the information includes oscillography from the electrical system controlling device.

18. The system of claim 15 wherein the information includes a transcript of events that occur within the electrical system controlling device.

19. The system of claim 15 wherein the information includes digitized current and voltage measurements.

20. The system of claim 15 wherein the information includes information from a data profiler within the electronic controls.

21. The system of claim 1 wherein the wireless communications interface sends and receives communications conforming to IEEE 802.11 a standard wireless Ethernet protocol.

22. The system of claim 1 wherein the wireless communications interface sends and receives communications conforming to IEEE 802.1 lb standard wireless Ethernet protocol.

23. The system of claim 1 wherein the wireless communications interface sends and receives communications conforming to IEEE 802.11 g standard wireless Ethernet protocol.

24. The system of claim 1 wherein the wireless communications interface sends and receives communications conforming to Bluetooth wireless communication protocol.

25. The system of claim 1 wherein the wireless communications interface sends and receives communications conforming to a fixed radio frequency protocol.

26. The system of claim 1 wherein the wireless communications interface sends and receives communications conforming to spread spectrum radio protocol.

27. The system of claim 1 wherein the electrical system controlling device is a switchgear.

28. The system of claim 1 wherein the electrical system controlling device is a single-phase recloser.

29. The system of claim 1 wherein the electrical system controlling device is a three-phase recloser.

30. The system of claim 1 wherein the electrical system controlling device is a regulator.

31. The system of claim 1 wherein the electrical system controlling device is pad-mounted.

32. The system of claim 1 wherein the electrical system controlling device is a sectionalizer.

33. The system of claim 1 wherein the electrical system controlling device is a capacitor switch.

34. The system of claim 1 wherein the electrical system controlling device is a switch.

35. The system of claim 1 wherein the electrical system controlling device is a faulted circuit indicator.

36. The system of claim 1, wherein the structure that is part of the high-voltage electrical distribution system is a utility pole.

37. The system of claim 1, wherein the electrical system controlling device includes one or more portions, and at least one of the one or more portions is underground.

38. The system of claim 1, wherein the electrical system controlling device and the housing including the embedded electronic controls are located near the top of a utility pole, and the wireless communications interface is located near the bottom of the utility pole.

39. The system of claim 1, wherein the wireless communications interface enables remote control of the electrical system controlling device including opening and closing of the contacts of the electrical system controlling device.

40. A method for controlling and monitoring an electrical system, the method comprising:

connecting to electronic controls embedded within a housing of an electrical system controlling device through a wireless communications interface that is remote from the housing, wherein:

the electrical system controlling device is mounted on a structure that is part of a high-voltage electrical distribution system, the electrical system controlling device includes contacts enclosed in the housing and connected to a power line included in the high-voltage electrical distribution system, and the wireless communications interface enables remote wireless access to the electronic controls to enable a remote device to wirelessly access information of the electrical controlling device and to wirelessly access a programming port of the electrical system controlling device, and to remotely control of the electrical system controlling device;

monitoring the high-voltage electrical distribution system using the electronic controls through the wireless communications interface including remotely accessing information of the electrical controlling device; and controlling the high-voltage electrical system using the electronic controls through the wireless communications interface such that distribution of electricity through the high-voltage electrical distribution system is controlled through the contacts.

41. The method of claim 40 wherein connecting to the electronic controls comprises:

accessing the electronic controls;

authenticating an account with the electronic controls; and establishing a secure connection to the electronic controls.

42. The method of claim 40 further comprising encrypting communications sent to and from the electronic controls through the wireless communications interface.

43. The method of claim 40 further comprising enabling remote operation of the electronic controls using the wireless communications interface.

44. The method of claim 40 wherein the electrical system controlling device is a switchgear.

45. The method of claim 40 wherein the electrical system controlling device is a single-phase recloser.

46. The method of claim 40 wherein the electrical system controlling device is a three-phase recloser.

47. The method of claim 40 wherein the electrical system controlling device is a regulator.

48. The method of claim 40 wherein the electrical system controlling device is pad-mounted.

49. The method of claim 40 wherein the electrical system controlling device is a sectionalizer.

50. The method of claim 40 wherein the electrical system controlling device is a capacitor switch.

51. The method of claim 40 wherein the electrical system controlling device is a switch.

52. The method of claim 40 wherein the electrical system controlling device is a faulted circuit indicator.

53. The method of claim 40, wherein the structure that is part of the high-voltage electrical distribution system is a utility pole.

54. The method of claim 40, wherein the electrical system controlling device includes one or more portions, and at least one of the one or more portions is underground.

55. A system for remotely controlling a high-voltage electrical distribution system, the system comprising:

a self-contained switching device comprising:

a housing;

contacts within the housing and being connected to a power line included in a high-voltage electrical distribution system such that opening and closing the contacts controls a flow of electricity through the high-voltage electrical distribution system; and electronic controls embedded within the housing, the electronic controls configured to monitor and control the self-contained switching device; and a wireless communications interface separate from the self-contained switching device that enables remote wireless access to the electronic controls to enable remote control and monitoring of the high-voltage electrical system through enabling a remote device to wirelessly access to a programming port of the self-contained switching device and to wirelessly access measured parameters of the self-contained switching device.

56. The system of claim 55 wherein remote access to measured parameters includes remote access to one or more of current and voltage measurements, oscillography, and a sequence of events associated with the self-contained switching device.

57. The system of claim 55 further comprising an antenna in communication with the wireless communications interface and the self-contained switching device and mounted on the self-contained switching device.

58. The system of claim 55 wherein the self-contained switching device comprises a switchgear.

59. The system of claim 55 wherein the self-contained switching device including the electronic controls is located near a top end of a utility pole, and the wireless communications interface is located near a bottom end of the utility pole.

60. The system of claim 55, wherein the self-contained switching device further comprises:

a long-range communications device configured to communicate with a central utility control center; and a short-range communications device.

* * * * *